United States Patent
Abdolee et al.

(10) Patent No.: US 11,165,540 B2
(45) Date of Patent: Nov. 2, 2021

(54) SPACE-TIME CODED MASSIVE MULTIPLE-INPUT MULTIPLE-OUTPUT (MIMO) WIRELESS SYSTEMS AND METHODS OF MAKING USING THE SAME

(71) Applicants: Reza Abdolee, Bakersfield, CA (US); Jeremy J. Ice, Bakersfield, CA (US); Vida Vakilian, Bakersfield, CA (US)

(72) Inventors: Reza Abdolee, Bakersfield, CA (US); Jeremy J. Ice, Bakersfield, CA (US); Vida Vakilian, Bakersfield, CA (US)

(73) Assignee: CSUB Auxiliary for Sponsored Programs Administration, Bakersfield, CA (US)

( * ) Notice: Subject to any disclaimer, the term of this patent is extended or adjusted under 35 U.S.C. 154(b) by 332 days.

(21) Appl. No.: 16/242,277

(22) Filed: Jan. 8, 2019

(65) Prior Publication Data
US 2019/0215103 A1    Jul. 11, 2019

Related U.S. Application Data

(60) Provisional application No. 62/614,893, filed on Jan. 8, 2018.

(51) Int. Cl.
*H04L 12/26* (2006.01)
*H04L 1/06* (2006.01)
(Continued)

(52) U.S. Cl.
CPC ......... *H04L 1/0668* (2013.01); *H04B 7/0413* (2013.01); *H04B 7/0456* (2013.01);
(Continued)

(58) Field of Classification Search
None
See application file for complete search history.

(56) References Cited

U.S. PATENT DOCUMENTS

| | | |
|---|---|---|
| 2009/0180454 A1 | 7/2009 | Au et al. |
| 2018/0013477 A1* | 1/2018 | Kim .................. H04B 7/06 |

(Continued)

OTHER PUBLICATIONS

Jeremy J. Ice et al.; "Space-Time Coded Massive MIMO for Next Generation Wireless Systems"; Int'l Conf. Wireless Networks; on or around Jul. 19, 2017; pp. 109-112; CSREA Press.
(Continued)

*Primary Examiner* — Zewdu A Beyen
(74) *Attorney, Agent, or Firm* — Andrew D. Fortney; Central California IP Group, P.C.

(57) ABSTRACT

Space-time coded massive (STCM) and space-frequency coded (SFC) massive multiple-input multiple-output (MIMO) wireless communication systems and methods of making and using the same are disclosed. The STCM-MIMO system utilizes two massive MIMO antenna arrays that transmit data over two or more channel vectors to a user with at least one receive antenna. This configuration permits the system to use the asymptotic orthogonal qualities of massive MIMO pre-coding to eliminate the interference from other users' channel vectors and signals. The system also maintains the diversity of space-time codes to recover lost data through treating each transmitting massive MIMO array similarly to a 2×1 Alamouti space-time code. The STCM-MIMO wireless system can significantly outperform those using space-time coding techniques only. The SFC massive MIMO wireless system may be similar to the STCM-MIMO wireless system, except for the encoder block. In the exemplary SFC massive MIMO architecture, instead of spreading the code across the time slots, the code is spread across the subcarriers.

18 Claims, 10 Drawing Sheets

100

| | Antenna 0 | Antenna 1 |
|---|---|---|
| Time t | $S_0$ | $S_1$ |
| Time t + T | $-S_1^*$ | $S_0^*$ |

(51) Int. Cl.
*H04L 27/26* (2006.01)
*H04B 7/0456* (2017.01)
*H04B 7/0413* (2017.01)
*H04B 7/06* (2006.01)

(52) U.S. Cl.
CPC ......... *H04B 7/0669* (2013.01); *H04L 1/0606* (2013.01); *H04L 1/0625* (2013.01); *H04L 1/0631* (2013.01); *H04L 1/0643* (2013.01); *H04L 27/2607* (2013.01)

(56) References Cited

U.S. PATENT DOCUMENTS

2018/0115912 A1* 4/2018 Gao .................. H04W 16/28
2018/0367192 A1* 12/2018 O'Shea .............. G06N 3/088

OTHER PUBLICATIONS

H. Sampath et al.; "Linear Precoding for Space-Time Coded Systems With Known Fading Correlations"; IEEE Comm. Letters; Jun. 2002; pp. 239-241; vol. 6, No. 6.
V. Le Nir et al.; "Reduced-Complexity Space Time Block Coding and Decoding Schemes With Block Linear Precoding"; France Telecom R&D; 10 pgs.

* cited by examiner

| | Antenna 0 | Antenna 1 |
|---|---|---|
| Time t | $s_0$ | $s_1$ |
| Time t + T | $-s_1^*$ | $s_0^*$ |

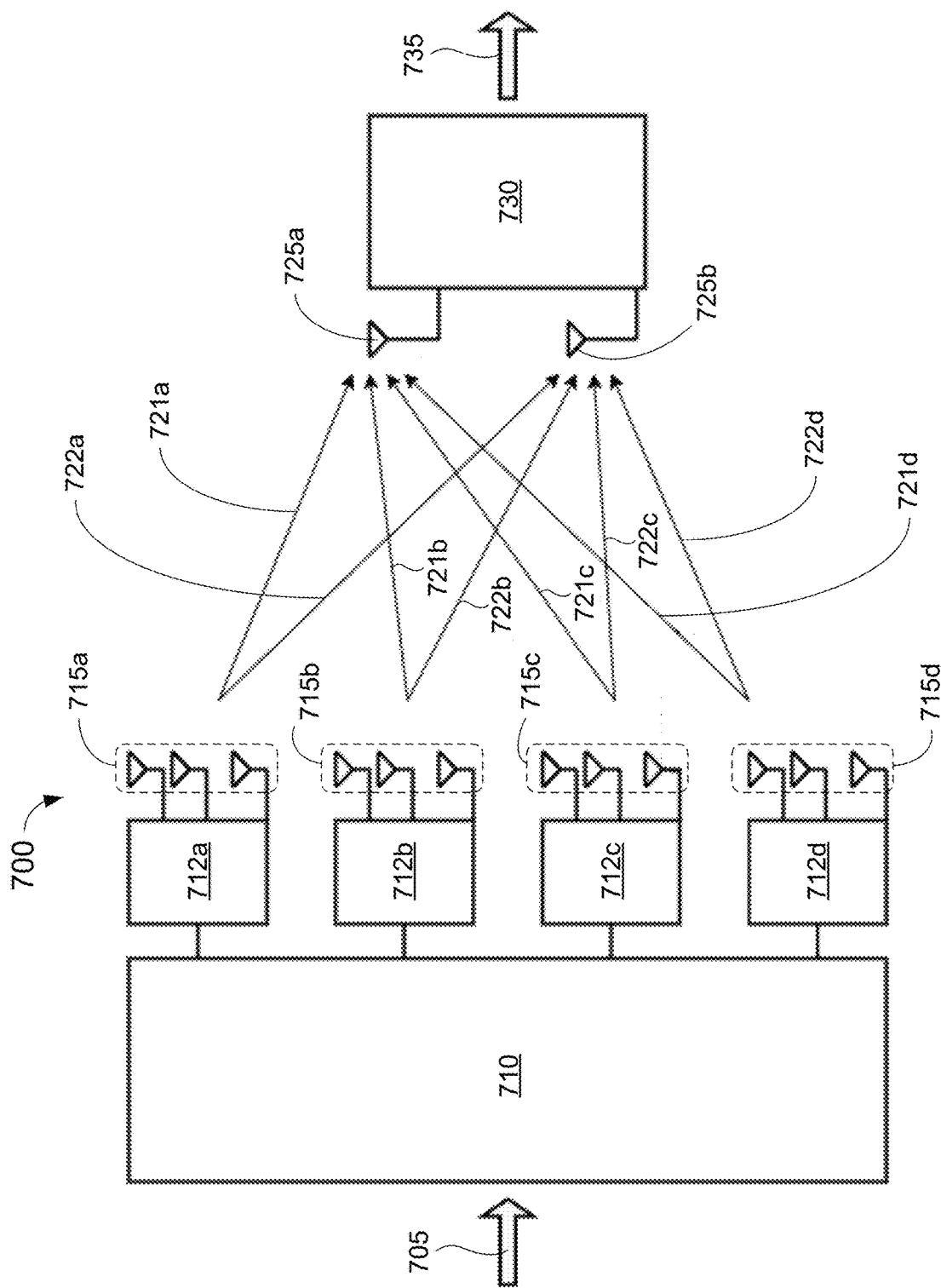

SPACE-TIME CODED MASSIVE MULTIPLE-INPUT MULTIPLE-OUTPUT (MIMO) WIRELESS SYSTEMS AND METHODS OF MAKING USING THE SAME

RELATED APPLICATION(S)

This application claims priority to U.S. Provisional Pat. Appl. No. 62/614,893, filed Jan. 8, 2018, incorporated herein by reference.

FIELD OF THE INVENTION

The present invention generally relates to the field of wireless communication systems. More specifically, embodiments of the present invention pertain to space-time coded massive multiple-input multiple-output (MIMO) wireless systems and methods of making and using the same.

DISCUSSION OF THE BACKGROUND

The primary objective of future wireless communication systems is to fulfill the demands of emerging bandwidth hungry multimedia applications and to serve the rapidly growing density of wireless users. Current wireless communication technologies may fail to meet such growing demands. Consequently, new techniques need to be explored to discover a reliable and capable system to be used for future wireless cellular networks.

Space-time block coding (STBC) is a promising wireless communication technique that can enhance the reliability and capacity of wireless networks. Space-time coding operates efficiently through an effect called diversity gain. Diversity gain is created by adding multiple antennas to either transmitter or receiver or both, and thus, increasing the number of communication channels between the transmitter and the receiver. The space-time diversity effect allows for greater signal clarity since multiple copies of the symbols are transmitted over the channels to recover faded or distorted data. A very efficient space-time coded system, which permits full diversity, employs orthogonal space-time codes to allow for simple linear processing at the receiver. Although the space-time codes are powerful and capable of enhancing the data rate and reliability of wireless systems, they may fail to efficiently accommodate the growing density in multi-user wireless systems.

A current potential 5G system candidate is massive MIMO, in which a large array of transmit antennas incorporate a linearly pre-coded vector with a conjugate transpose vector corresponding to the channel vector from the transmit antenna array to the receiver. When the pre-coded vector is matched with the channel vector, the signal is preserved. However, when the pre-coded vector is mismatched with a channel vector, these terms are considered interference from other users, and both terms are asymptotically orthogonal and are effectively canceled.

Massive MIMO is an emerging technology that can solve the limited bandwidth issue of wireless communication systems to accommodate a larger density of users. One idea of massive MIMO is to use a large number of transmit antennas at a base station with linear pre-coding and combining, respectively, to eliminate interfering signals at the mobile station. Linear pre-coding increases the signal clarity and efficient bandwidth usage of massive MIMO. Linear pre-coding involves the exploitation of the asymptotic orthogonal qualities of the system's channel vectors. With a base station composed of a large number of transmit antennas, Hermitian pre-coding can be implemented. Hermitian pre-coding involves applying the complex-transpose of the channel vectors to estimate the signal.

Future wireless communications technology should address the interference of an ever-growing user density and combat the attenuation of wireless channels due to the presence of multipaths. Space-time coded symbols can be retrieved with relative ease through linear processing at the receiver, due to the intrinsic orthogonal nature of space-time codes. Diversity has been explored, and space-time coding configurations have been generalized to permit the use of $N_t$ transmit antennas and $N_r$ receive antennas. The diversity of the system increases significantly as the number of transmit and receive antennas increases. Although the space-time coding schemes can increase diversity, they cannot be of great help when the communication system operates in densely populated areas and/or where the inter-cell or inter-cell interferences are significantly high.

A large user density interference problem can be tackled by incorporating a large number of transmit antennas with linear pre-coding. The linear pre-coding, at the transmitter, allows the system to process the data and recover the transmitted symbol by cancelling the interference from other users. This is accomplished by massive MIMO's asymptotic orthogonal property of the channel vectors with respect to the matched pre-coded parameter vectors. The pre-coded parameter vector used in the system is the conjugate-transpose (Hermitian) of the matched channel vector utilized from the transmitter to the receiver. The pre-coded Hermitian parameter vector is used at the base station with large number of antennas to encode the transmit symbols. This allows the receiver to retrieve the transmit data through the law of large numbers, where the matched pre-coded parameter vectors' and channel vectors' product is the squared magnitude of the matched channel vector, and the mismatched vectors are treated as being asymptotically orthogonal to one another. It also allows the simultaneous transmission of multiple users' data over the same communication resources, such as bandwidth, time and frequency without significant detriment on or interference with one another.

Space-time coded massive (STCM)-MIMO techniques have been explored in the past. In one example, a system was proposed in which a single array of M transmit antennas at the base station transmit to K users with one antenna each. The system used linear precoding at the base station to address interference from other users, and after pre-coding the signal, the signal was coded with a rateless space-time code, then transmitted from the M transmit antennas. This approach specifically addresses antenna failure and takes into account a system with a random number of M transmission antennas. It was accomplished by sending signal X, which is a T×M quasi-orthogonal matrix, which could utilize the Alamouti code over two timeslots and every two entries in the M dimension of the X signal matrix.

Similarly, a BS equipped with M transmit antennas and a receiver with one receive antenna has been used, which also used space-time coding at the receiver with the linear precoding. A signal S=WX was derived, where W is a unique M×N pre-coder matrix in which alternating entries are 0 and N is the number of symbols being transmitted, and X is the T×N Alamouti space-time coding matrix. A base station equipped with one array of M transmit antennas was utilized to transmit to users with two receive antennas each. The space-time coding occurs at the user during uplink for communicating with the base station. The user utilizes spacetime coding matrix X, which is a T×2 matrix, where T is two.

A hybrid analog-digital architecture for the base station and an analog-only architecture for the users, both utilizing a massive MIMO antenna configuration with a large number of antennas in a single antenna array at both the base station and receiver, is also known. Like the previous examples, the signal is space-time coded at the transmitter, before receiving massive MIMO pre-coding for transmission.

A massive MIMO system is known in which the base station is equipped with a single array of M transmit antennas and the receiver is equipped with two antennas. At the base station, the space-time coded matrix Q is a 2×T matrix, and then the Golden Code is applied to the signal. This, like the other techniques discussed above, allows the system to achieve diversity in some form while using a massive MIMO configuration including a transmit antenna array of M transmit antennas.

Space-Time Codes

Space-time codes diversify a transmitted signal through both the space and time domains. The space domain is represented by the number of transmit antennas being utilized at the base station, which allows data to be transmitted simultaneously to the receiver. The time domain is represented by multiple time slots that the signal is transmitted over. For example, in the Alamouti scheme, a base station transmits a signal with two transmit antennas to the wireless user. As shown in FIG. 1, the base station transmits symbols $s_0$ and $s_1$ simultaneously and respectively from Antenna 1 and Antenna 2 at the first time block, at time t. Then symbols $-s_1^*$ and $s_0^*$ are respectively transmitted from the Antenna 1 and the Antenna 2 at the second time block, at a second time t+T.

The receiver of communication systems which utilizes the Alamouti Code takes advantage of this orthogonality of the STBC codes to linearly estimate the signal. For an Alamouti transmit system, consisting of two transmit antennas and one receive antenna, the received signals can be written as:

$$r_0 = r(t) = h_0 s_0 + h_1 s_1 + n_0$$

$$r_1 = r(t+T) = -h_0 s_1^* + h_1 s_0^* + n_1 \quad (1)$$

where $r_0$ and $r_1$ are the received signals at time t and t+T respectively, $h_0$ is the channel over which symbol $s_0$ at time t and symbol $-s_1^*$ at time t+T are sent, $h_1$ is the channel utilized to send symbol $s_1$ at time t and symbol $s_0^*$ at time t+T, and $n_0$ and $n_1$ are the additive white Gaussian noise (AWGN) the signal encounters during transmission. Both $h_0$ and $h_1$ are represented by fading coefficients which are generalized as $\alpha_0 e^{j\theta_0}$ and $\alpha_1 e^{j\theta_1}$ respectively. The received signals are then linearly combined at the receiver where the Alamouti Code exploits the orthogonal qualities of the system. The combined signals can be represented by:

$$\tilde{s}_0 = h_0^* r_0 + h_1 r_1^*$$

$$\tilde{s}_1 = h_1^* r_0 - h_0 r_1^* \quad (2)$$

where $\tilde{s}_0$ and $\tilde{s}_1$ are sent to the likelihood detector to estimate $s_0$ and $s_1$ respectively. By utilizing this method, the redundancy of the transmitted symbols allows the system to recover data that may have been lost or heavily distorted during transmission in one of the channels. This is a product of the diversity that space-time codes enable in their utilization in wireless communication systems.

FIG. 2 shows a model 200 of the 2×1 Alamouti system. An input 205 comprising two symbols $s_0$ and $s_1$ is sent to a transmitter 210. A first antenna 215a transmits symbols $s_0$ and $-s_1^*$ over a channel 220a at a first time and a second (later) time, respectively, and a second antenna transmits symbols $s_1$ and $s_0^*$ over a channel 220b at the first time and the second time, respectively. The symbols are received as approximate symbols by a third antenna 225 and processed by a receiver 230. An output 235 comprising the approximate symbols is sent to a likelihood detector to estimate the original symbols in the input 205.

Massive MIMO

Massive MIMO applies a concept of pre-coding that enables a signal to be estimated very efficiently at the receiver. The theory behind the massive MIMO pre-coding is that with a large number of transmit antennas, a signal can be transmitted to a specific user and transmit data over the same bandwidth occupied by many other users. FIG. 3 is a massive MIMO model 300, with one user visually depicting how the channel vector is exploited by the signal pre-coding. An input 305 comprising a symbol is sent to a transmitter 310. The symbol is pre-coded at the transmitter 310 with a Hermitian of a channel vector, whose length is equal to the number of transmit antennas 315a-c used in the system. The pre-coded symbol is transmitted over channels 321a-c, which compose channel vector 320, by the transmit antennas 315a-c and received at the receiver antenna 325. The pre-coded parameter vector is matched with the channel vector 320, comprising channels 321a-c, at the receiver 330 resulting in an output 335. The massive MIMO linear processing can be represented as:

$$y_0 = w_0^H h_0 s_0 + \sum_{j \neq 0}^{K} w_j^H h_0 s_j + n \quad (3)$$

where $y_0$ is the received signal, $w_0$ is the pre-coding vector parameter, $h_0$ is the channel vector composed of complex fading coefficient of the channels from each transmitting antenna to the receive antenna with variance one and mean zero, K is the number of mobile users, and $w_j$ are the pre-coded channel vectors utilized to transmit to additional users. In Equation (3), $w_j$ and $s_j$ are interference at the desired user's receiver. The pre-coding vector of each user k is defined as:

$$w_k^H = \frac{h_k^H}{M} \quad (4)$$

where $w_0$ represents the precoding vector of user 0 and M is the number of transmit antennas. The asymptotic orthogonal property of the channels allows the interference of the signal to be greatly reduced, when the number of transmit antennas theoretically approaches infinity. Choosing the precoding vectors of all users according to Equation (4) and assuming the asymptotic orthogonal property of the channels results in:

$$w_0^H h_0 = \frac{1}{M} \|h_0\|^2 \Rightarrow \lim_{M \to \infty} \frac{1}{M} \|h_0\|^2 = 1 \quad (5)$$

$$w_0^H h_1 = \frac{1}{M} h_0^H h_1 \Rightarrow \lim_{M \to \infty} \frac{1}{M} h_0^H h_1 = 0$$

Equation (5) depicts the asymptotic orthogonal properties of the channel vectors when the two channel vectors of user 1 and user 2 are mismatched. When the channel vectors are matched and M goes to infinity, their squared magnitude approaches the value of M, allowing their product to go to one. Equation (5) further implies that the larger the number of transmit antennas used at the base station, the less the signal interference is, with minimal error in the process of transmission. For example, if Equation (3) is evaluated with a large value of M, the equation ideally becomes $y_0=s_0+n$, leaving the original signal and the AWGN.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to a system of wireless communication wherein the copies of the data can be used to replace data that has become distorted or lost during the transmission and multiple users of a wireless devices (e.g., a cellphone) can utilize the same frequency bandwidth as other users without sacrificing the reliability of the signal due to the interference from other users.

The current invention relates to a new wireless technology that may be termed space-time coded massive (STCM)-MIMO that combines the advantages of the space-time codes and massive MIMO systems. The present system benefits from the diversity feature of space-time codes and the interference cancellation capability of massive MIMO systems. The diversity of space-time codes is preserved in the present system by treating multiple arrays of massive MIMO transmit antenna elements similarly to treatment of individual transmit antennas by space-time codes. This arrangement allows an antenna array to transmit data over a channel vector to the receiver, while each additional antenna array does the same over other channel vectors.

When the number of transmit antennas is large (e.g., typically 64 or more), the law of large numbers permits massive MIMO systems to treat the channels as being orthogonal, which allows for an approximate elimination of the other signals' and channels' interference from the desired signal. This concept is combined in the STCM-MIMO system of the current invention, as two or more separate massive MIMO systems work together at a base station to eliminate the interference at the desired users. A wireless system with the present STCM-MIMO technology significantly outperform systems that use space-time coding or massive MIMO techniques alone.

Thus, the invention at least in part concerns a combination of space-time code utilization and linear pre-coding with an array of transmission antennas of a massive MIMO system. The massive MIMO system comprises $N_t$ antenna arrays at the transmitter and $N_r$ receive antennas at the receiver. At the transmitter, the signal for the desired user is space-time encoded with a corresponding space-time encoding matrix. A sum of $N_r$ pre-coded vector parameters are then applied at each transmit antenna array, corresponding to the channels created between the transmit antenna array and each receive antenna. The receiver then uses a simple space-time linear combination estimation and detection scheme to retrieve the signal accordingly.

Diversity is the desirable product of space-time codes that is used in the present space-time coded massive MIMO system. Adding additional users to the massive MIMO system allows their pre-coded signals to be evaluated across the channel vector of the desired user. The other users' pre-coded channel vectors are orthogonal to the desired user's channel vector, so the value of their interference approaches zero.

In addition, the invention concerns at least in part a generalization of the STCM-MIMO system, where the system uses space-time coding and transmit antenna array configurations to increase the symbol diversity of the system, while simultaneously taking advantage of the interference cancellation and bandwidth efficiency of massive MIMO. We initially introduced a system with two transmit antenna arrays at the base station to transmit two space-time coded symbols to a user with one receive antenna. In the present general STCM-MIMO configuration, we consider M transmit antennas and $N_r$ receive antennas. $M/N_t$ transmit antennas are grouped in each array, resulting in $N_t$ transmit antenna arrays, and a total of M transmit antennas. Using this configuration, diversity and system reliability increase as at least one (and alternatively both) of $N_t$ and $N_r$ increases. The present STCM-MIMO system significantly outperforms traditional massive MIMO systems, particularly in the case where M is much greater than $N_t \times N_r$.

For example, the present invention relates at least in part to a wireless communication system, comprising an encoder configured to space-time encode data, $N_t$ transmitter arrays, a receiver having $N_r$ receive antennas, and a decoder. Each of the $N_t$ transmitters has $M/N_t$ transmit antennas and is configured to transmit the space-time encoded data from the corresponding $M/N_t$ transmit antennas. $N_t$ is an integer of at least 2, and M is an integer of at least 32. The $N_r$ receive antennas are configured to receive the space-time encoded data. $N_r$ is an integer of at least 1. The decoder is configured to decode the space-time encoded data from the receiver.

In some embodiments of the wireless communication system, the encoder encodes the data at a rate of 1 symbol or less per transmission time period. For example, the data encoding rate may be $(N_t-1)/N_t$ symbols or less per transmission time period. In such as example, $N_t$ may be an integer of at least 3 or 4. In other or further embodiments, the encoder encodes the data as an $T \times N_t$ matrix. In such embodiments, each of the $M/N_t$ transmit antennas may transmit a corresponding and/or unique row of the data in or from the matrix.

In various embodiments of the wireless communication system, the data comprises a sequence of symbols. Each of the symbols may be chosen from a set with at least 2 or 4 elements. This can go up to constellation size of 4096.

Yet another aspect of the present invention relates at least in part to a method of making a wireless communication system, comprising operably connecting $N_t$ array transmitters to an encoder configured to space-time encode data, operably connecting a decoder configured to decode the space-time encoded data to a receiver having $N_r$ receive antennas configured to receive the space-time encoded data, and configuring the $N_t$ antenna arrays and the receiver so that the $N_t$ arrays wirelessly communicate the space-time encoded data to the receiver. Each of the $N_t$ transmitters has $M/N_t$ transmit antennas and is configured to transmit the space-time encoded data from the corresponding $M/N_t$ transmit antennas. $N_t$ is an integer of at least 2, and M is an integer of at least 32. $N_r$ is an integer of at least 1.

One advantage of the invention over existing commercial wireless communication technology is the ability to both utilize diversity gain (which current technologies use) and interference cancellation (which massive MIMO systems use). Thus, the combination used in the invention is more reliable system than either other technology alone. The economic potential and commercial applications of the invention are significant as the system operates more reliably than contemporary technologies with less signal power. The clarity of the signal in a low signal to noise ratio is increased beyond what current technologies are able to achieve. The data processing throughout the system remains simple and inexpensive to incorporate into consumer devices.

A general STCM-MIMO technique as disclosed herein can use $N_t$ transmit antenna arrays and $N_r$ receive antennas. This allows the system to be more openly customizable to fit the needs of the wireless community and industry. With this generalization, the wireless system exploits the symbol diversity provided by the space-time coding and the interference cancelling abilities of the massive MIMO antenna arrays and linear pre-coding. This technique treats each massive MIMO transmit antenna array similarly to a traditional space-time system treatment of each antenna. Results show that the present STCM-MIMO technique significantly outperforms traditional massive MIMO.

These and other advantages of the disclosed invention will become apparent to those skilled in the art from the detailed description of various embodiments below.

BRIEF DESCRIPTION OF THE DRAWINGS

FIG. 7 an exemplary space-time coded massive MIMO wireless communication system with four massive transmitter arrays and two receivers in accordance with one or more embodiments of the present invention.

DETAILED DESCRIPTION

Figures 1, 2:
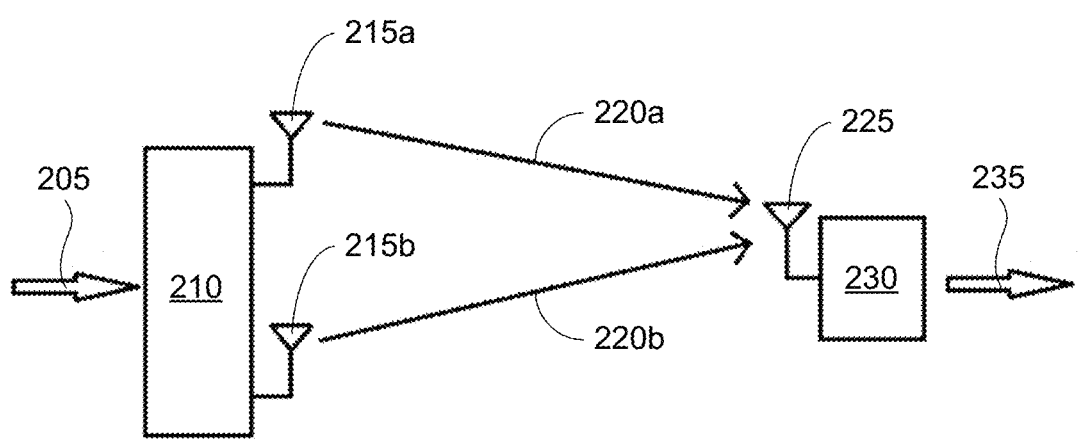
FIG. 1 is a table showing an Alamouti space-time code in which two symbols are transmitted from two antennas at different times.
FIG. 2 is a wireless communication system using a 2×1 Alamouti model.
Figure 3:
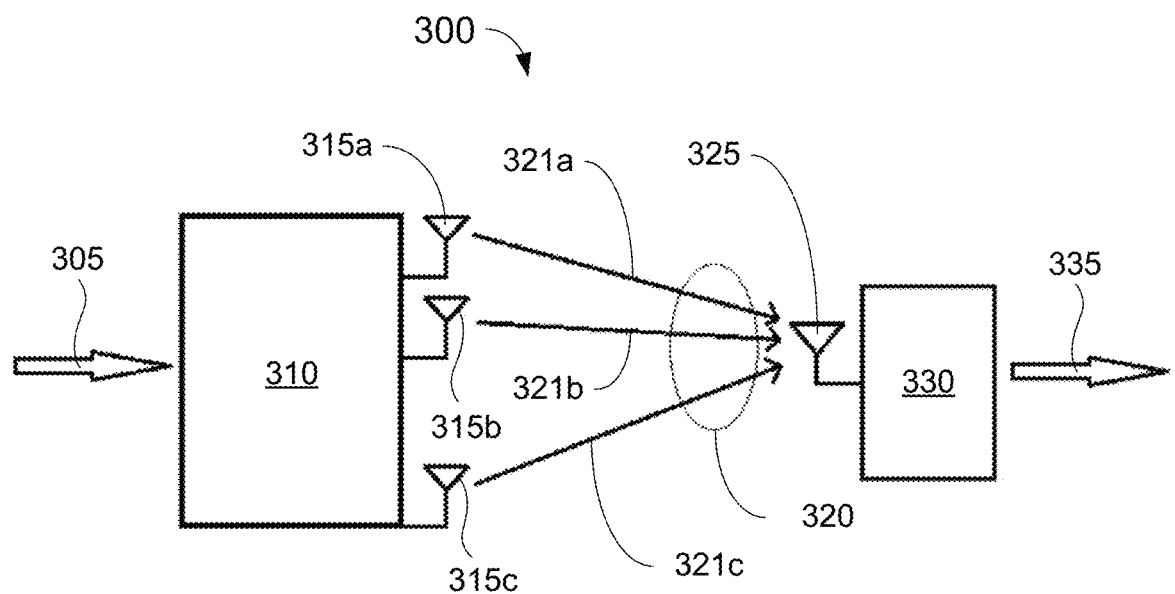
FIG. 3 is an exemplary massive multiple-input multiple-output (MIMO) wireless communication system.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Interference cancellation and communication channel reliability can be attained through space-time coding and by employing massive MIMO technology. Space-time coding permits the system to take advantage of symbol diversity, which allows the receiver to recover data by evaluating redundant transmitted symbols. For the problem of space-time coding schemes and efficient function with the interference from a large user density, massive MIMO techniques excel.

The current invention combines the advantages of space-time codes and massive MIMO systems and may be referred to as space-time coded massive (STCM) MIMO. The current invention benefits from the diversity feature of space-time codes and the interference cancellation capability of massive MIMO systems. The diversity of space-time codes is preserved by treating multiple arrays of massive MIMO transmit antenna elements, similarly to how a space-time code would treat individual transmit antennas. This arrangement allows an antenna array to transmit data over a channel vector to the receiver, while each additional antenna array does the same over other channel vectors.

When the number of transmit antennas are much larger than the number of receive antennas, the law of large numbers permits massive MIMO systems to treat the channels as being orthogonal, allowing for an approximate elimination the other signals' and channels' interference to the desired signal. This concept is combined in the present STCM-MIMO system as two separate massive MIMO systems working in tandem at a base station in order to eliminate the interference of the signals and channels not directed at the desired users. A wireless system employing the present STCM-MIMO technology may significantly outperform ones with only space-time coding techniques.

Space-Time Coded Massive MIMO

Figure 4:
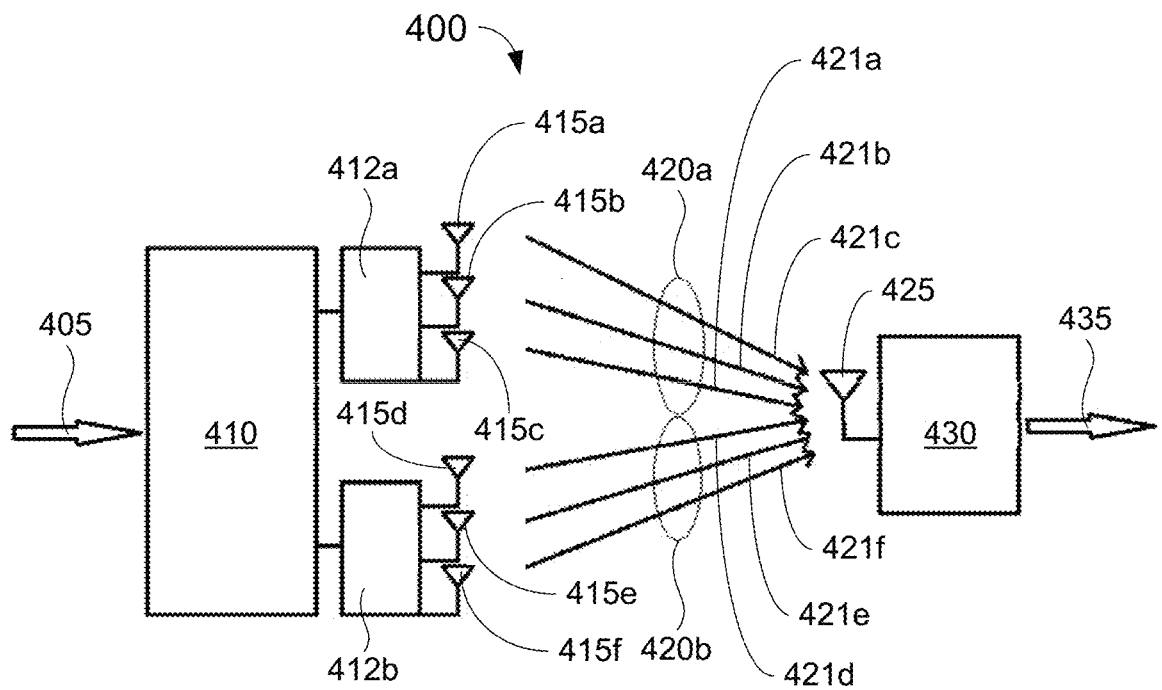
FIG. 4 is an exemplary space-time coded massive MIMO wireless communication system with two transmitter arrays and one receiver in accordance with one or more embodiments of the present invention.

The present invention utilizes the diversity of space-time codes and the pre-coding of massive MIMO. This goal is accomplished with a base station with two arrays of M transmit antennas transmitting to users with one receive antenna. A model of this STCM-MIMO system is shown in FIG. 4.

The orthogonal channel vectors (e.g., channel vector 420a-b) eliminate most of the interference from other peripheral signals. With the massive MIMO portion of the system implemented, the Alamouti space-time matrix can be utilized (FIG. 1). The symbols, in the corresponding time block, are transmitted from the two massive MIMO arrays 412a-b in the space dimension of the matrix. The Alamouti space-time matrix permits the system to transmit multiple copies of the original signals in one or more subsequent time slots, allowing for signal diversity and clarity. Equation (6) may be applied to ideally exploit both the space-time coding and massive MIMO systems in the combined scheme:

$$\tilde{r}_0 = \tilde{r}(t) = w_0^H h_0 s_0 + w_1^H h_1 s_1 + \sum_{j \neq 0}^{K-1} (w_{2j}^H h_0 s_{2j} + w_{(2j+1)}^H h_1 s_{(2j+1)}) + \tilde{n}_0 \quad (6)$$

$$\tilde{r}_1 = \tilde{r}(t+T) = -w_0^H h_0 s_1^* +$$

$$w_1^H h_1 s_0^* + \sum_{j \neq 0}^{K-1} (-w_{2j}^H h_0 s_{(2j+1)}^* + w_{(2j+1)}^H h_1 s_{2j}^*) + \tilde{n}_1$$

When the signals are received, they are now able to follow the linear combination of the Alamouti Code and take advantage of its diversity. The combined signals can be expressed as Equation (7):

$$\tilde{s}_0 = \|h_0\|^2 \tilde{r}_0 + \|h_1\|^2 \tilde{r}_1^*$$

$$\tilde{s}_1 = \|h_1\|^2 \tilde{r}_0 + \|h_0\|^2 \tilde{r}_1^* \quad (7)$$

where $\tilde{s}_0$ and $\tilde{s}_1$ are then sent to the likelihood detector to estimate $s_0$ and $s_1$. In order to evaluate this system fairly, the power of the transmit signals in both STCM-MIMO and Alamouti scheme are normalized to one. This allows for the STCM-MIMO system to be evaluated at the same overall power that the Alamouti system radiates with two antennas.

Through this process, the signal undergoes the pre-coding techniques of a massive MIMO system, eliminating most of the interference from other users and other channels, and also undergoes the Alamouti space-time diversity scheme, allowing signals that were distorted by AWGN to be reevaluated and recovered from the redundancy of the space-time aspect of the system.

Generalized Space-Time Codes

A wireless communication system may be generalized to be configured with $N_t$ transmit antennas and $N_r$ receive antennas. Alamouti's space-time encoding may be expanded from a 2×2 encoder (e.g., FIG. 1) to a $N_t$×t space-time encoder that corresponds to the number of transmit antennas and the number of time slots used in the space-time code configuration. The generalized received signal takes into account the $N_t$ transmit antennas and $N_r$ receive antennas, and can be expressed in the following Equation (8):

$$r_{t,p} = \sum_{j=0}^{N_t-1} h_{p,j} x_{t,j} + n_{t,p} \quad (8)$$

where $r_{t,p}$ is the received signal at time t and receive antenna p, $N_t$ is the total number of transmit antennas, $h_{p,j}$ is the channel between receive antenna p and transmit antenna j, and $n_{t,p}$ is the AWGN. The signal $x_{t,j}$ is the specific symbol at time t from transmit antenna j corresponding to the X space-time coded matrix in Equation (9):

$$X = \begin{pmatrix} s_0 & s_1 & \frac{s_2}{\sqrt{2}} & \frac{s_2}{\sqrt{2}} \\ -s_1^* & s_0^* & \frac{s_2}{\sqrt{2}} & -\frac{s_2}{\sqrt{2}} \\ \frac{s_2^*}{\sqrt{2}} & \frac{s_2^*}{\sqrt{2}} & \frac{(-s_0 - s_0^* + s_1 - s_1^*)}{2} & \frac{(-s_1 - s_1^* + s_0 - s_0^*)}{2} \\ \frac{s_2^*}{\sqrt{2}} & -\frac{s_2^*}{\sqrt{2}} & \frac{(s_1 + s_1^* + s_0 - s_0^*)}{2} & -\frac{(s_0 + s_0^* + s_1 - s_1^*)}{2} \end{pmatrix} \quad (9)$$

The specific symbols $x_{t,j}$, where j=1, 2, . . . , $N_t$ are transmitted simultaneously at time t from transmit antennas 1 through $N_t$.

Figure 5:
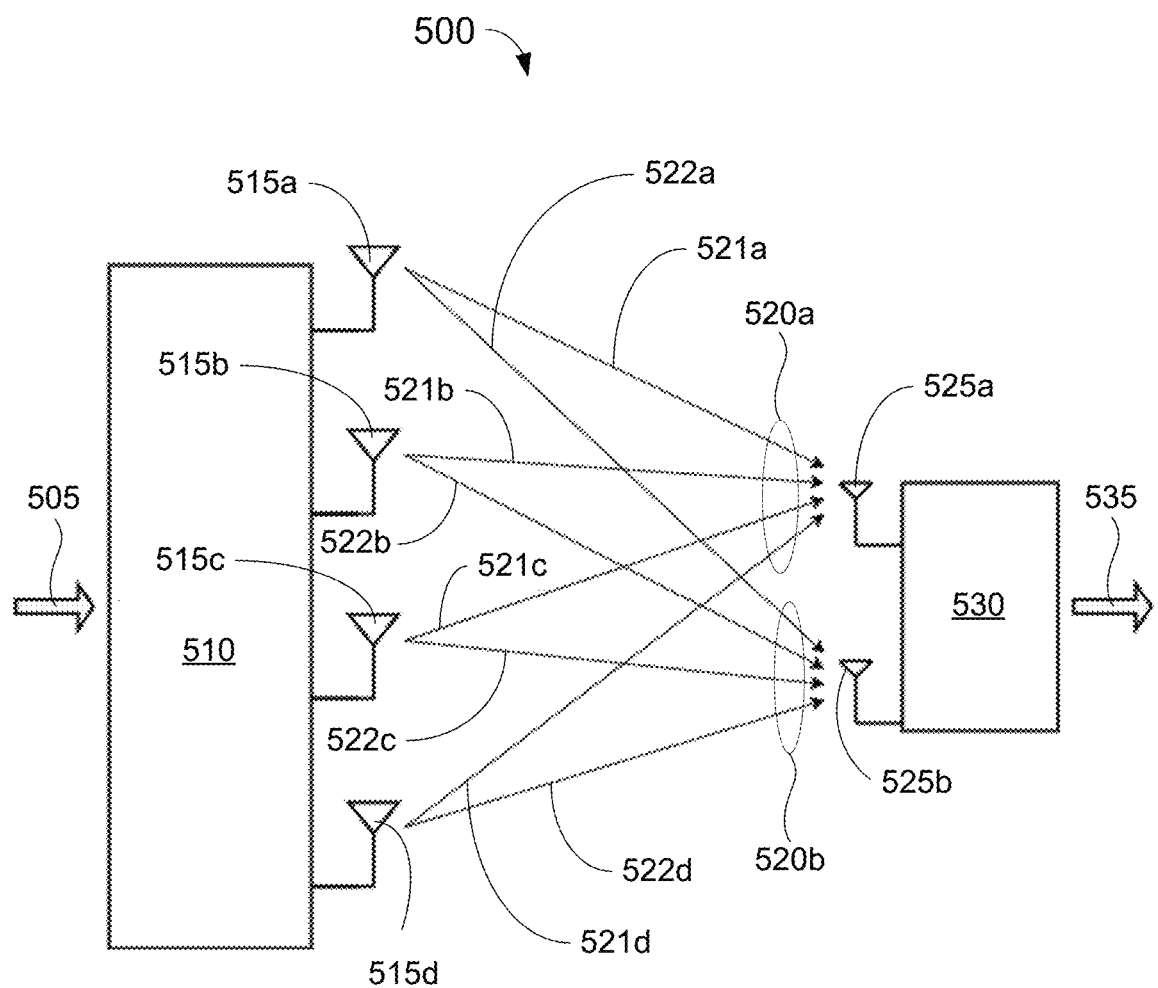
FIG. 5 is a generalized space-time coded wireless communication system with four transmitters and two receivers.

In the system 500 with four transmit antennas and two receive antennas shown in FIG. 5, the symbols are encoded from the space-time code matrix X at the transmitter 510. The matrix X shows three symbols being transmitted over four transmit antennas. This is to allow a higher data rate than the transmission of four symbols, due to the smaller amount of time blocks necessary to achieve orthogonality. This code has a rate of 3/4, derived from three symbols being transmitted through four time blocks.

Once the received signal is detected, a corresponding and/or appropriate 3/4 rate decoder in the receiver 530 estimates the transmitted signal. The appropriate decoding formulas, corresponding to the space-time code matrix X, can be expressed as Equation (10) below, where $\tilde{s}_0$, $\tilde{s}_1$, and $\tilde{s}_2$ are the estimated signals of $s_0$, $s_1$, and $s_2$ respectively. This code can be used to develop a STCM-MIMO structure with high-dimension MIMO configurations and space-time codes.

$$\tilde{s}_0 = \sum_{j=0}^{N_r-1} r_{0,j} h_{0,j}^* + (r_{1,j}) * h_{1,j} + \frac{(r_{3,j} - r_{2,j})(h_{2,j}^* - h_{3,j}^*)}{2} - \frac{(r_{2,j} + r_{3,j}) * (h_{2,j} + h_{3,j})}{2} \quad (10a)$$

-continued $$\tilde{s}_1 = \sum_{j=0}^{N_r-1} r_{0,j} h_{1,j}^* - (r_{1,j})^* h_{0,j} + \frac{(r_{3,j}+r_{2,j})(h_{2,j}^*-h_{3,j}^*)}{2} + \frac{(-r_{2,j}+r_{3,j})*(h_{2,j}+h_{3,j})}{2} \quad (10b)$$

$$\tilde{s}_2 = \sum_{j=0}^{N_r-1} \frac{(r_{0,j}+r_{1,j})(h_{2,j}^*)}{\sqrt{2}} + \frac{(r_{0,j}-r_{1,j})(h_{3,j}^*)}{\sqrt{2}} + \frac{(r_{2,j})*(h_{0,j}+h_{1,j})}{\sqrt{2}} + \frac{(r_{3,j})*(h_{0,j}-h_{1,j})}{\sqrt{2}} \quad (10c)$$

Generalized Space-Time Coded Massive MIMO

Figure 6:
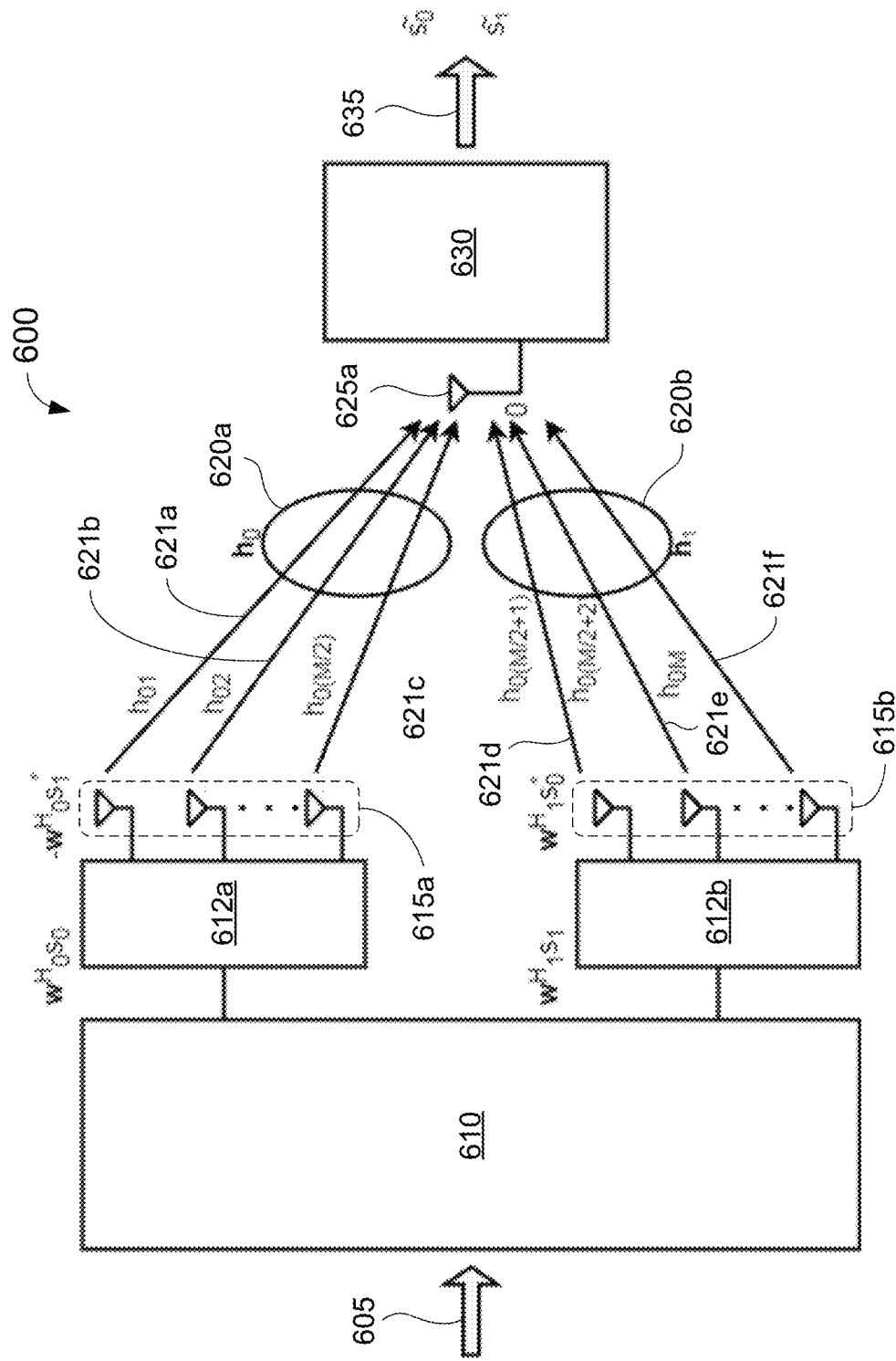
FIG. 6 is an exemplary space-time coded massive MIMO wireless communication system with two massive transmitter arrays and one receiver in accordance with one or more embodiments of the present invention.

Even a relatively simple 2N×1 STCM-MIMO system exploits the interference cancellation provided from the massive MIMO pre-coding. Each transmit antenna array, $N_t$, has N transmit antennas, where $N=M/N_t$ antennas. FIG. 6 depicts a system 600 of a 2N×1 STCM-MIMO system, where two symbols are transmitted from two transmitters 612*a-b*, each having a corresponding antenna array 615*a-b*. This system 600 utilizes a full-rate symbol encoding scheme with two transmit antenna arrays 615*a-b* and two time slots for transmission. The pre-coded symbols are transmitted across channel vectors 620*a-b* and the received signal at the receiver 630 can be expressed as Equation (11):

$$\tilde{r}_0 = \tilde{r}(t) = w_0^H h_0 s_0 + w_1^H h_1 s_1 + \sum_{j\neq 0}^{K-1}(w_{2j}^H h_0 s_{2j} + w_{(2j+1)}^H h_1 s_{(2j+1)}) + \tilde{n}_0 \quad (11a)$$

$$\tilde{r}_1 = \tilde{r}(t+T) = -w_0^H h_0 s_1^* + w_1^H h_1 s_0^* + \sum_{j\neq 0}^{K-1}(-w_{2j}^H h_0 s_{(2j+1)}^* + w_{(2j+1)}^H h_1 s_{2j}^*) + \tilde{n}_1 \quad (11b)$$

where $\tilde{r}_0$ is the received signal at time slot t, $\tilde{r}_1$ is the received signal at time slot t+T, $w_j$ is the massive MIMO pre-coding parameter equal to $(N_t/M) \times h_j$, and K is the number of users with one receive antenna each.

A generalized STCM-MIMO system can be constructed where $N_t$ is dependent on the space-time encoder being used, and $N_r$ is dependent on the desired diversity for the system. In the case of the 3/4 rate encoder from space-time code X, there are four columns in the encoder (e.g., 710 [FIG. 7]) matrix, which correspond to $N_t=4$ arrays of $N=M/N_t$ transmit antennas each, for a total of M transmit antennas for the system. The coded symbol from each column in matrix X are transmitted from the corresponding array of N=M/4 transmit antennas (e.g., 715*a-d* in FIG. 7) to the receiver (e.g., 730).

In a 4N×1 configuration, the system includes one receive antenna. The system takes into account the diversity gain from four channel vectors being used from the four transmit antenna arrays to the one receive antenna. If greater diversity is required, more receive antennas can be utilized to create more channels from transmitter to receiver. In the case of a 4N×2 system 700 as shown in FIG. 7, two receive antennas 725*a-b* are used, and the diversity of the system is evaluated over eight channel vectors 721*a-*722*d* from transmitter 710 to receiver 730.

Through combining Equation (8) and Equation (11), Equation (12) can be derived, which is generalized to use any encoding scheme desired for essentially any STCM-MIMO system:

$$r_{t,p}^k = \sum_{i=0}^{n_t-1}(w_{p,i}^k)^H h_{p,i}^k x_{t,i}^k + \sum_{n\neq p}^{N_r-1}\sum_{j=0}^{N_t-1}(w_{n,j}^k)^H h_{p,j}^k x_{t,j}^k + \sum_{q\neq p}^{K-1}\sum_{v=0}^{N_r-1}\sum_{l=0}^{N_t-1}(w_{v,l}^q)^H h_{p,l}^k x_{t,l}^q + \tilde{n}_{t,p}^k \quad (12)$$

where $r_{t,p}^k$ is the received signal at time t at receive antenna p for user k, $(w_{p,i}^k)^H$ is the pre-code vector parameter corresponding to the channel from transmit antenna i to receive antenna p, at user k, $N_t$ is the total number of transmit antenna arrays in the system, $N_r$ is the total number of receive antennas, K is the total number of users, and $x_{t,i}^k$ is the specific symbol at time t from transmit antenna i for user k, which corresponds to the coded symbols of spacetime code X, and $\tilde{n}_{t,p}^k$ is the AWGN.

The first term of Equation (12) is the desired part of the received signal in which the transmitted symbols are preserved. The second term of Equation (12) is the auto-interference of the system, stemming from each additional pre-coded vector parameter utilized to correspond to each additional receive antenna at the user. The third term of Equation (12) is the interference from the addition of other users. When M (the number of transmit antennas) is large, the second and third terms of this equation are essentially cancelled due to the interference cancelling properties of the massive MIMO portion of the system's configuration, leaving only the first term to be evaluated at the space-time decoder.

This configuration allows the STCM-MIMO system to utilize any combination of transmit antennas and receive antennas. The estimated signals can be found through the techniques where the space-time coded symbols used can be simply linearly decoded. For example, a 4N×4 space-time encoder, such as X, can be used within this STCM-MIMO system. Using this 3/4 rate space-time encoder, the STCM-MIMO received signals can subsequently be decoded as seen in the 3/4 rate combiner shown in Equation (13):

$$\tilde{s}_0 = \sum_{j=0}^{N_r-1} r_{0,j}^k \|h_{0,j}^k\|^2 + (r_{1,j}^k)^* \|h_{1,j}^k\|^2 + \frac{(r_{3,j}^k - r_{2,j}^k)(\|h_{2,j}^k\|^2 - \|h_{3,j}^k\|^2)}{2} - \frac{(r_{2,j}^k + r_{3,j}^k)^*(\|h_{2,j}^k\|^2 + \|h_{3,j}^k\|^2)}{2} \quad (13a)$$

$$\tilde{s}_1 = \sum_{j=0}^{N_r-1} r_{0,j}^k \|h_{1,j}^k\|^2 - (r_{1,j}^k)^* \|h_{0,j}^k\|^2 + \frac{(r_{3,j}^k + r_{2,j}^k)(\|h_{2,j}^k\|^2 - \|h_{3,j}^k\|^2)}{2} + \frac{(-r_{2,j}^k + r_{3,j}^k)^*(\|h_{2,j}^k\|^2 + \|h_{3,j}^k\|^2)}{2} \quad (13b)$$

$$\tilde{s}_2 = \sum_{j=0}^{N_r-1} \frac{(r_{0,j}^k - r_{1,j}^k)(\|h_{2,j}^k\|^2)}{\sqrt{2}} + \frac{(r_{0,j}^k - r_{1,j}^k)\|h_{3,j}^k\|^2}{\sqrt{2}} + \frac{(r_{2,j}^k)^*(\|h_{0,j}^k\|^2 + \|h_{1,j}^k\|^2)}{\sqrt{2}} + \frac{(r_{3,j}^k)^*(\|h_{0,j}^k\|^2 - \|h_{1,j}^k\|^2)}{\sqrt{2}} \quad (13c)$$

where $\tilde{s}_0$, $\tilde{s}_1$, and $\tilde{s}_2$ are the estimated symbols of $s_0$, $s_1$, and $s_2$, respectively. Here the system is taking advantage of the space-time code's diversity, while already having benefited from the interference cancellation due to the massive MIMO linear pre-coding.

FIG. 7 shows a 4N×2 STCM-MIMO system 700, where each antenna array 715*a-d* includes N=M/4 (three) transmit antennas of the total of M (12) transmit antennas. Three symbols, $s_0$, $s_1$, and $s_2$ are encoded and then transmitted from the four transmit antenna arrays 715a-d across eight channel arrays 721a-d and 722a-d, using the 3/4 rate space-time encoding from X. Generally, the transmitted symbol from the corresponding transmit antenna array is pre-coded with a sum of $N_r$ pre-code vector parameters, due to unique qualities of each channel from that transmit antenna array to each of the receive antennas 725a-b. In the case of FIG. 7, two pre-code vector parameters are used at each array to correspond to the two wireless channels created from each transmit antenna array 715a-d to the two receive antennas 725a-b. Without the sum of the corresponding pre-code vector parameters, the transmit symbol may be lost at one or more of the receive antennas (e.g., at antenna 725b) due to the interference cancellation property of the system, in which case no additional diversity would be achieved from the additional receive antenna.

Computer Experiment Results

Figure 8:
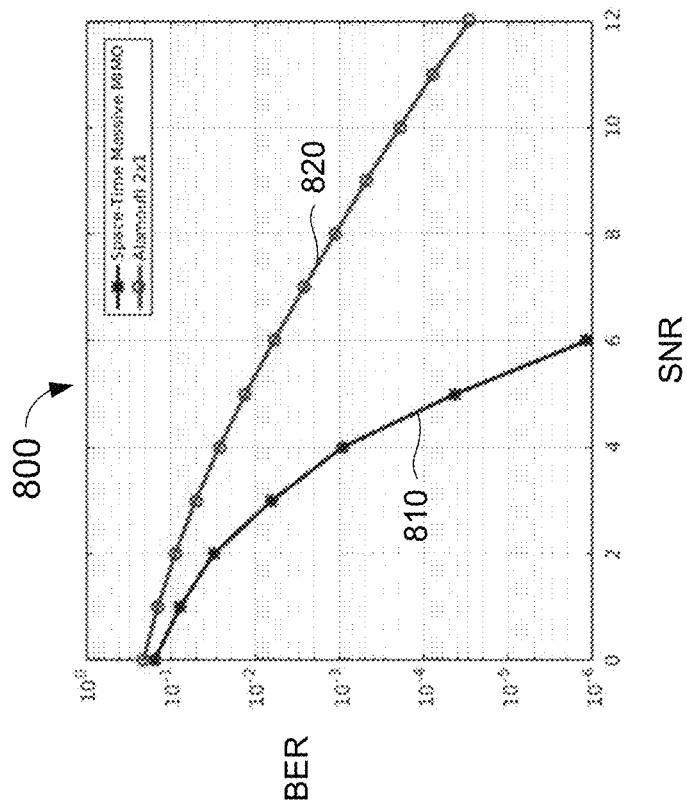
FIG. 8 is a graph showing bit error rates (BERs) for space-time coded massive MIMO vs. Alamouti 2×1 systems, simulated for signals over a range of signal-to-noise ratios (SNRs).

The graph 800 in FIG. 8 demonstrates the bit error rate (BER) efficiency of a STCM-MIMO system exemplifying the system 400 of FIG. 4 in comparison to a system using the Alamouti space-time code only. The STCM-MIMO system (line 810) utilizes two massive MIMO transmit antenna arrays of 100 antennas each (M=200) and a user with one receive antenna, while the system using Alamouti space-time code only (line 820) uses the 2×1 transmit antenna-receive antenna configuration. Otherwise, the two systems are identical. The simulations of the STCM-MIMO and Alamouti systems also take into account the interference of two other users by introducing the interfering users' signals and channels to the individual simulations. This is done to demonstrate the interference-canceling abilities of the massive MIMO portion of the present system, and to maintain equal conditions for both simulations.

Both the STCM-MIMO and Alamouti code systems are similar in the signal combining and signal estimation processes at the receiver, and both have their signal power normalized. In the simulations, Rayleigh fading wireless channels and AWGN are assumed and considered. The STCM-MIMO system simulation performed with significantly improved efficiency over the Alamouti 2×1 system simulation. The STCM-MIMO system simulation reaches a BER of $10^{-3}$ at a signal to noise ratio (SNR) of 4 dB, which is 4 dB better than the Alamouti system simulation, which reached a BER of $10^{-3}$ at an SNR of 8 dB. As the SNR becomes higher, the STCM-MIMO system simulation produces a BER of $10^{-4}$ at an SNR of 5 dB, whereas the Alamouti system simulation reaches a BER of $10^{-4}$ at an SNR of 11 dB, a 6 dB difference.

Figure 9:
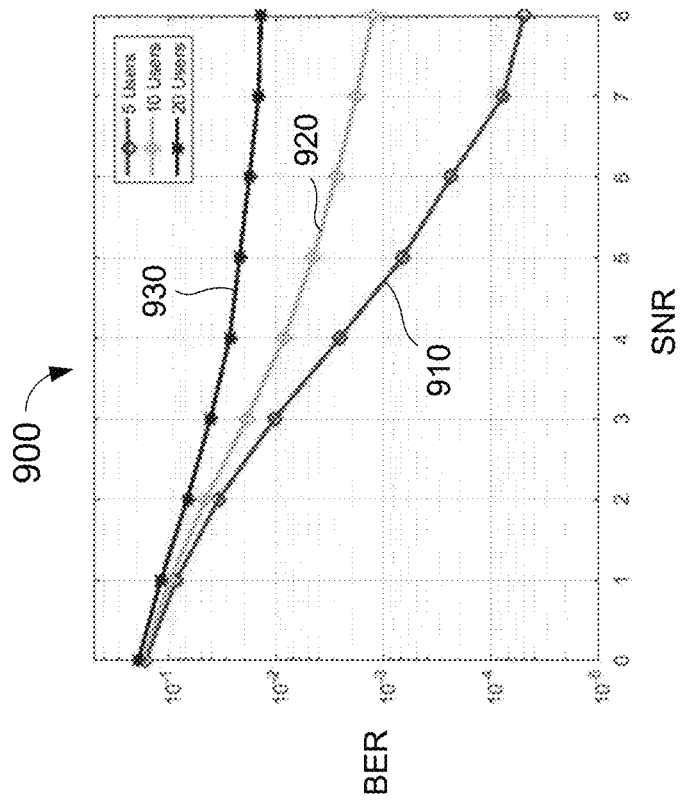
FIG. 9 is a graph showing BERs for a space-time coded massive MIMO system with 100 transmit antennas per array at varying user densities, simulated for signals over a range of SNRs.

The graph 900 in FIG. 9 demonstrates the effect that increased user density has on the STCM-MIMO system. In the simulation, 100 transmitting antennas per array are utilized to evaluate 5 users (line 910), 10 users (line 920), and 20 users (line 930). As the ratio of transmit antennas to number of users gets smaller, the interference becomes more noticeable and can affect the clarity of the signal to the desired user.

The simulation results in FIG. 9 demonstrate that at 100 transmit antennas and 5 users (line 910), the BER approaches $10^{-5}$ at an SNR of 8 dB, but appears to level out where it converges with the value of the interference of the five users. At 10 users (line 920), the BER converges to $10^{-3}$ at an SNR of 8 dB, and at 20 users (line 930), the BER converges at $10^{-2}$ at an approximate SNR of 6 dB. This BER convergence can be reduced to much smaller values for increased reliability performance by introducing more transmit antennas.

Figure 10:
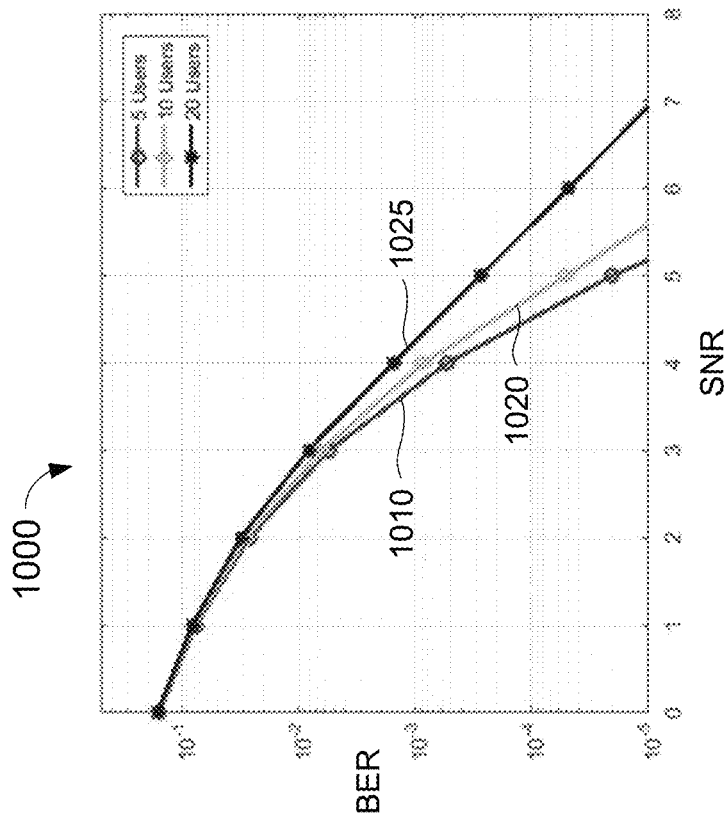
FIG. 10 is a graph showing BERs for a space-time coded massive MIMO system with 600 transmit antennas per array at varying user densities, simulated for signals over a range of SNRs.

The graph 1000 in FIG. 10 demonstrates the STCM-MIMO system performance with 5 users (line 1010), 10 (line 1020), and 20 users (1025), but with 600 transmit antennas per antenna array. The BER convergence is significantly smaller, and the reliability is not nearly as affected as it is in the simulation in FIG. 9. The simulation produced a BER of nearly $10^{-5}$ at an SNR of 5 dB with 5 users (line 1010), which performed only 0.5 dB better than when the interference of 10 users (line 1020) is simulated. When 20 users (line 1025) are simulated, the BER of $10^{-5}$ was reached at an SNR of 7 dB, approximately 2 dB worse than five users. FIG. 10 shows that by adding additional transmit antennas, the signal remains very reliable for a growing user density.

The results as described with respect to FIGS. 8-10 show that the current invention performs more efficiently than either the Alamouti coding scheme or a massive MIMO system alone. Space-time codes provide transmit diversity, which allow the signal an opportunity to retain or recover the data if a symbol is lost during transmission. Massive MIMO systems enable a spectrum-efficient multi-user wireless communication system. By combining space-time coding techniques with a massive MIMO system, space-time coded massive MIMO systems offer the benefits of both technologies.

Figure 11:
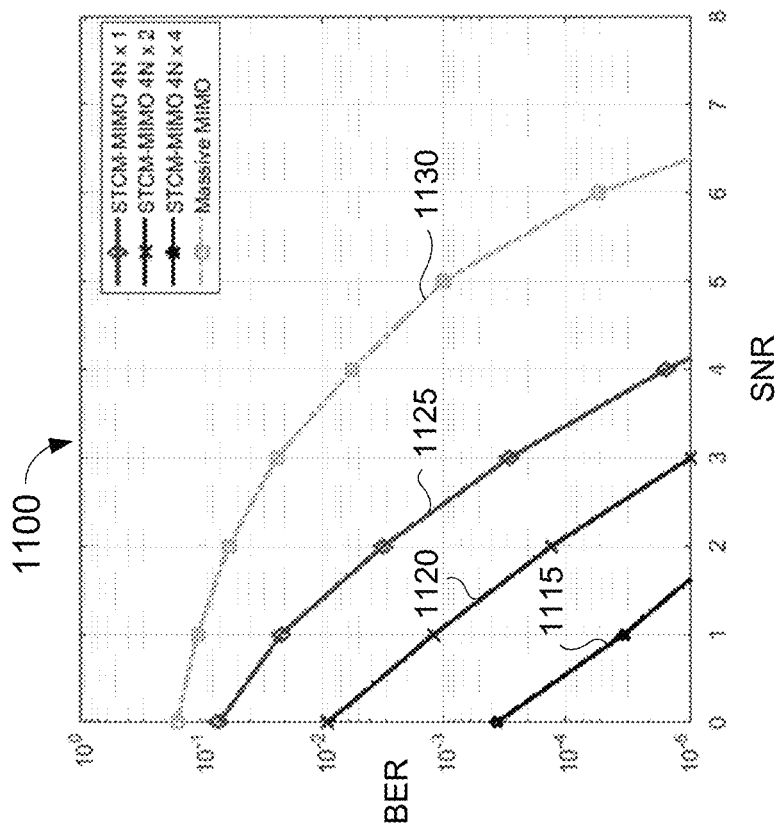
FIG. 11 is a graph showing BERs for various space-time coded massive MIMO systems and a massive MIMO system each with 500 total transmitter antennas, simulated for signals over a range of SNRs.

The graph 1100 in FIG. 11 demonstrates STCM-MIMO systems with 4N×1 (line 1125), 4N×2 (line 1120), and 4N×4 (line 1115) antenna configurations while utilizing the 3/4 rate space-time encoding, in comparison to a space-time coded-only system and to a massive MIMO system (line 1130) of M (i.e., 4) transmit antennas and one receive antenna. Both the STCM-MIMO and the massive MIMO system simulations have a base station that includes M=500 total transmit antennas, each normalized in power to be equal to the four transmit antennas of the space-time coded configurations. Each simulation also considers the interference created by having three users in each scheme.

The 4N×1 STCM-MIMO configuration (line 1125) reached a BER of $10^5$ at an SNR of 4 dB, performing 2.5 dB better than the massive MIMO system simulation (line 1130), which has a BER of $10^{-5}$ at an SNR of 6.5 dB. While the 4N×2 STCM-MIMO configuration (line 1120) reached a BER of $10^5$ at an SNR of 3 dB, performing 1 dB better than the 4N×1 STCM-MIMO system simulation (line 1125), and 3.5 dB better than the massive MIMO system simulation (line 1130). Ultimately, the 4N×4 STCM-MIMO system simulation (line 1115) reached a BER of $10^{-5}$ at an SNR of 1.5 dB, which performed 1.5 dB better than the 4N×2 STCM-MIMO system simulation (line 1120), 2.5 dB better than the 4N×1 STCM-MIMO system simulation (line 1125), and 5 dB better than the massive MIMO simulation (line 1130).

Figure 12:
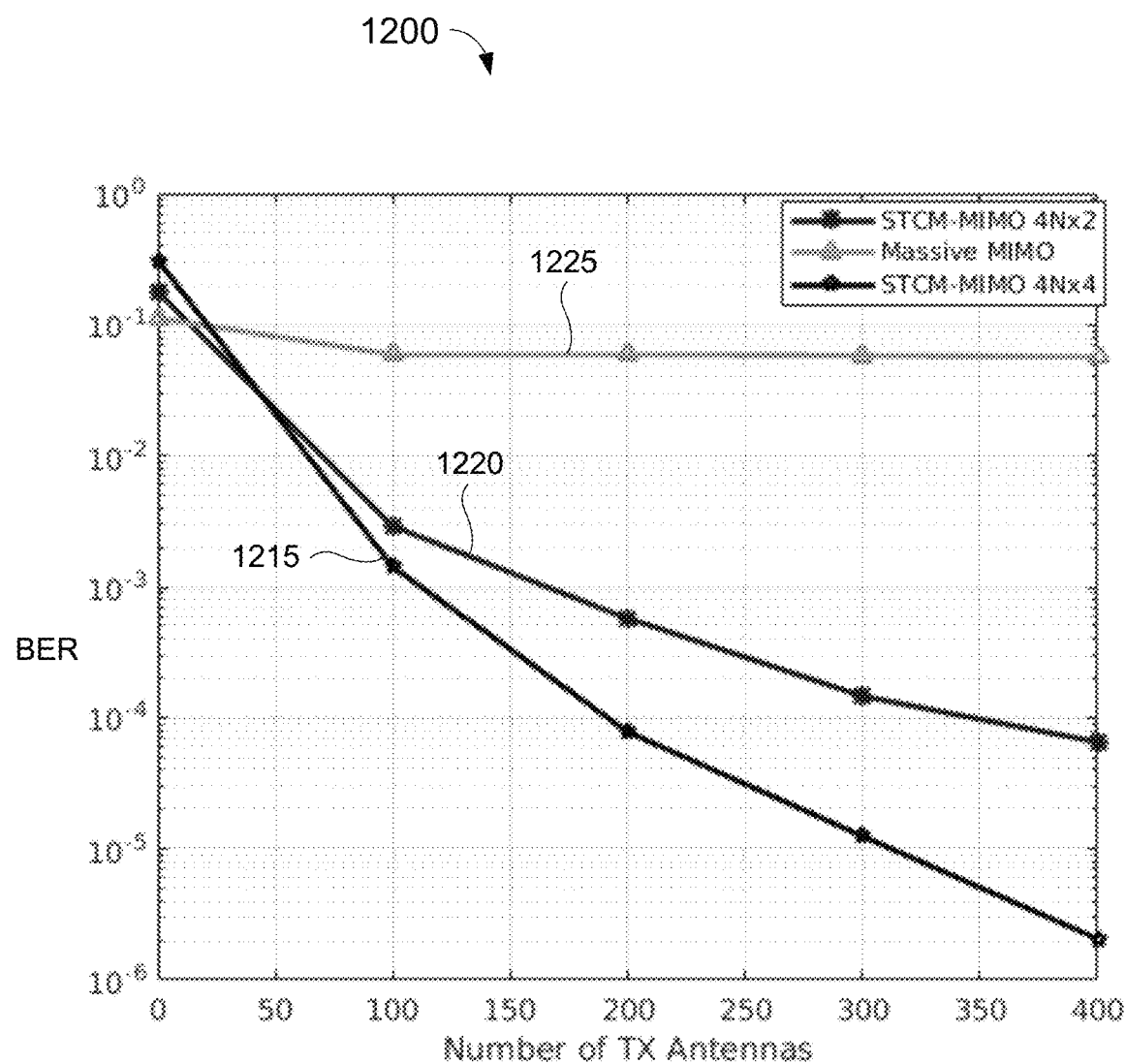
FIG. 12 is a graph showing BER versus number of transmitter antennas for exemplary space-time coded massive MIMO systems and a massive MIMO system over a static SNR of 2 dB.

The graph 1200 in FIG. 12 demonstrates the systems' BER as M transmit antennas increases for a 4N×4 (line 1215), a 4N×2 (line 1220) STCM-MIMO system, and a traditional massive MIMO system (line 1225). The static SNR in this simulation was set to 2 dB to observe the BER trends of the three different configurations. Similar to FIG. 11, the simulations of FIG. 12 also have normalized overall system power, and three users are considered for each system to introduce interference so the interference cancelling properties of the massive MIMO portion of the systems can be utilized.

The massive MIMO simulation (line 1225) did not vary significantly with additional antennas at an SNR of 2 dB, due to the system's lack of diversity gain, so it stayed consistent at a BER of about $10^{-1}$. The 4N×2 STCM-MIMO configuration (line 1220) shows great improvement in BER from $10^{-1}$ to $10^{-4}$ as the total number of transmit antennas for the system increased to 400. The 4N×4 STCM-MIMO configuration (line 1215) demonstrates a more rapid improvement of the system as the number of transmit antennas increases. The simulation shows that the 4N×4 STCM-MIMO system (line 1215) improves its BER from $10^{-0.5}$ to $10^{-5.5}$ as the total number of transmit antennas for the system increased to 400 antennas. It shows improvement over both other configurations when the total number of transmit antennas for the system is as small as 50.

From these simulations, it is clear that when $M >> (N_t \times N_r)$, the systems are able to take advantage of both the diversity provided by the space time codes and the interference cancellation of the massive MIMO technique. When $N_t=4$ and $M=500$, the total number of transmit antennas for each transmit antenna array in the system is $N=125$, which remains sufficient to maintain the diversity and interference cancellation for all STCM-MIMO systems in the computer simulation. As $N_r$ receive antennas increases, so does the number of pre-coding vector parameters that are needed at the transmitter. The number of pre-coding vector parameters is equal to $N_r$. The system then creates auto-interference while transmitting across its multiple channels due to a need to assess the redundant pre-coding parameter coefficients to ensure that diversity is preserved throughout the system. The system also experiences interference from the signals over $N_t \times N_r$ number of channels from each other user. FIGS. 11 and 12 demonstrate that when $M >> (N_t \times N_r)$, then the STCM-MIMO system cancels additional interference and still retains the diversity provided by the space-time coding.

The generalized STCM-MIMO system performs more efficiently than a corresponding massive MIMO system alone. Generalized STCM-MIMO systems take advantage of generalized space-time coding techniques to obtain diversity of the system, while maintaining the interference cancelling properties provided by massive MIMO antenna arrays. For STCM-MIMO systems with large $N_t$ and large $N_r$, where M is much larger than $N_t \times N_r$, the system maintains both diversity gain and interference cancellation capability.

Wideband Space-Time Block Coded Massive MIMO

Figure 13:
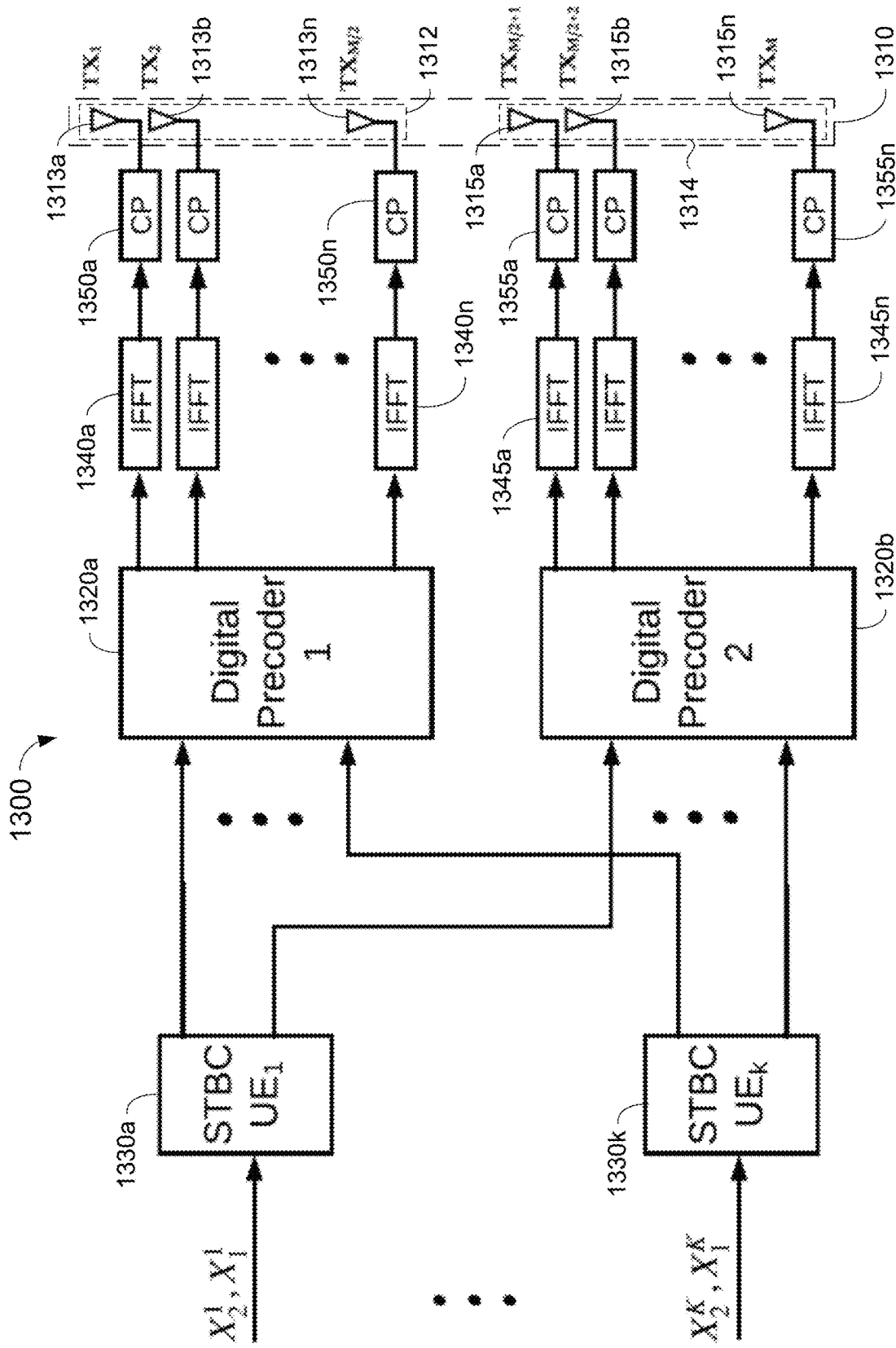
FIG. 13 is a diagram of an exemplary wideband space-time coded massive MIMO transmitter (e.g., base station) in accordance with one or more embodiments of the present invention.

A general block diagram of an exemplary transmitter 1300 for a wideband space-time coded massive MIMO system is shown in FIG. 13, where the base station (BS) with an antenna array 1310 of size M is configured to transmit data to K users over multipath wireless channels. The system can include one to $N_r$ receiver antennas (see FIG. 14 and the discussion thereof below). All users are served over the same time, code and frequency resources.

An Exemplary Wideband STBC Massive MIMO Transmitter

The number of digital decoders and the subarrays in the transmitter 1300 depends on the space dimension of the space-time block that the system uses. For simplicity, a 2×2 Alamouti space-time block code is used in the exemplary system. Hence, the number of digital precoders 1320a-b and subarrays 1312, 1314 in the BS 1300 is two, and each subarray 1312, 1314 has M/2 antennas (where M is, e.g., an integer of at least 4, 8, 16, or any other integer greater than 4). The first antenna subarray 1312 comprises antenna elements 1313a-n. The second antenna subarray comprises antenna elements 1315a-n.

As shown in FIG. 13, the two data vectors to be transmitted to a user k, denoted by $X^k_1$ and $X^k_2$, are sent to the space-time encoder $UE_k$ 1330k. Similarly, the two data vectors to be transmitted to a first user, denoted by $X^1_1$ and $X^1_2$, are sent to the space-time encoder $UE_1$ 1330a. Each of the data vectors (e.g., $X^k_1$ and $X^k_2$) contains N symbols (where N is an integer of at least 2) that are generated by a digital modulation technique, such as QAM or PSK, or their higher constellation sizes. These data vectors can be given as:

$$X_1^k = [X_1^k(1), X_1^k(2), \ldots, X_1^k(N)]$$

$$X_2^k = [X_2^k(1), X_2^k(2), \ldots, X_2^k(N)]$$

where N is the size of the N-point inverse fast Fourier transform (IFFT) and fast Fourier transform (FFT) functions, or the number of the subcarriers that the system uses in the frequency domain. The output of the space-time coder for each user k is:

$$\begin{bmatrix} -X_2^{k*} & X_1^k \\ -X_1^{k*} & X_2^k \end{bmatrix}$$

where the number of columns indicate the number of time slots of the code that the system uses, which is 2 in the present example. A similar output is generated for the first user and any users between the first and $k^{th}$ users. The first and second rows of the matrix code for each user $k \in \{1, 2, \ldots, K\}$ is, respectively, supplied to the first and second massive MIMO digital precoders 1320a-b. The precoders 1320a-b use the following coefficient vector for user k to encode its data:

$$W^k = [W^k(1), W^k(2), \ldots, W^k(N)]^T$$

where $W^k(n) \in C^{M \times 1}$. When the input of a precoder is $\{X^1_t, X^2_t, \ldots X^K_t\}$, its output $U_t = [U_{t,1}, U_{t,2}, \ldots, U_{t,M}]^T \in C^{M \times N}$ becomes:

$$U_t = \left\{ \underbrace{\left( \begin{bmatrix} w_1^1(1) \\ \vdots \\ w_M^1(1) \end{bmatrix} X_t^1(1) + \ldots + \begin{bmatrix} w_1^K(1) \\ \vdots \\ w_M^K(1) \end{bmatrix} X_t^K(1) \right)}_{\text{subcarrier 1}}, \ldots, \right.$$

$$\left. \underbrace{\left( \begin{bmatrix} w_1^1(N) \\ \vdots \\ w_M^1(N) \end{bmatrix} X_t^1(N) + \ldots + \begin{bmatrix} w_1^K(N) \\ \vdots \\ w_M^K(N) \end{bmatrix} X_t^K(N) \right)}_{\text{subcarrier N}} \right\}$$

Therefore, the $m^{th}$ output line of the precoder generate vector $U_{t,m} = [U_{t,m}(1), U_{t,m}(2), \ldots, U_{t,m}(N)]$ where its $n^{th}$ entry $U_{t,m}(n)$ is determined or computed as follows:

$$U_{t,m}(n) = w_m^1(1)X_t^1(n) + w_m^2(n)X_t^2(n) + \ldots + w_m^K(n)X_t^K(n)$$

Each output line of the precoders 1320a-b is connected to an IFFT processing block 1340a-n, 1345a-n. Each of the IFFT processing blocks 1340a-n, 1345a-n converts the signal from the frequency domain to the time domain. When the input vector $U_{t,m}$ is fed to the $m^{th}$ IFFT 1345n, it produces the time domain signal $S_{t,m} = F^{-1}(U_{t,m}) \in C^{1 \times N}$, where $$S_{t,m} = [S_{t,m}(1), S_{t,m}(2), \ldots, S_{t,m}(N)]$$

As shown in FIG. 13, the transmitter 1300 then adds a cyclic prefix or other data/information block isolator at 1350a-n, 1355a-n to the output of each (e.g., $m^{th}$) data/information block from the IFFT processor 1340a-n, 1345a-n, and sends it over wireless channels using the corresponding (e.g., $m^{th}$) antenna element 1313a-n, 1315a-n. For example, a cyclic prefix may isolate different blocks of data or information (e.g., OFDM data) from each other when the wireless channel contains multiple paths. It may be an exact copy of the last part of an OFDM symbol (e.g., in the block) and may function as a guard interval to protect the OFDM signals (e.g., in the block) from inter-symbol interference.

The transmitter 1300, including the space-time encoders 1330a-k, the digital precoders 1320a-b, the IFFT blocks 1340a-n, 1345a-n, and the cyclic prefix adder blocks 1350a-n, 1355a-n, can be implemented in a digital signal processor, a field-programmable gate array (FPGA) or an application-specific integrated circuit (ASIC), such as a SNAPDRAGON system-on-chip (SOC) ASIC/processor (available from Qualcomm Inc., San Diego, Calif.), or a SPARTAN-3 FPGA (available from Xilinx Inc., San Jose, Calif.).

An Exemplary Wideband STBC Massive MIMO Receiver

Figure 14:
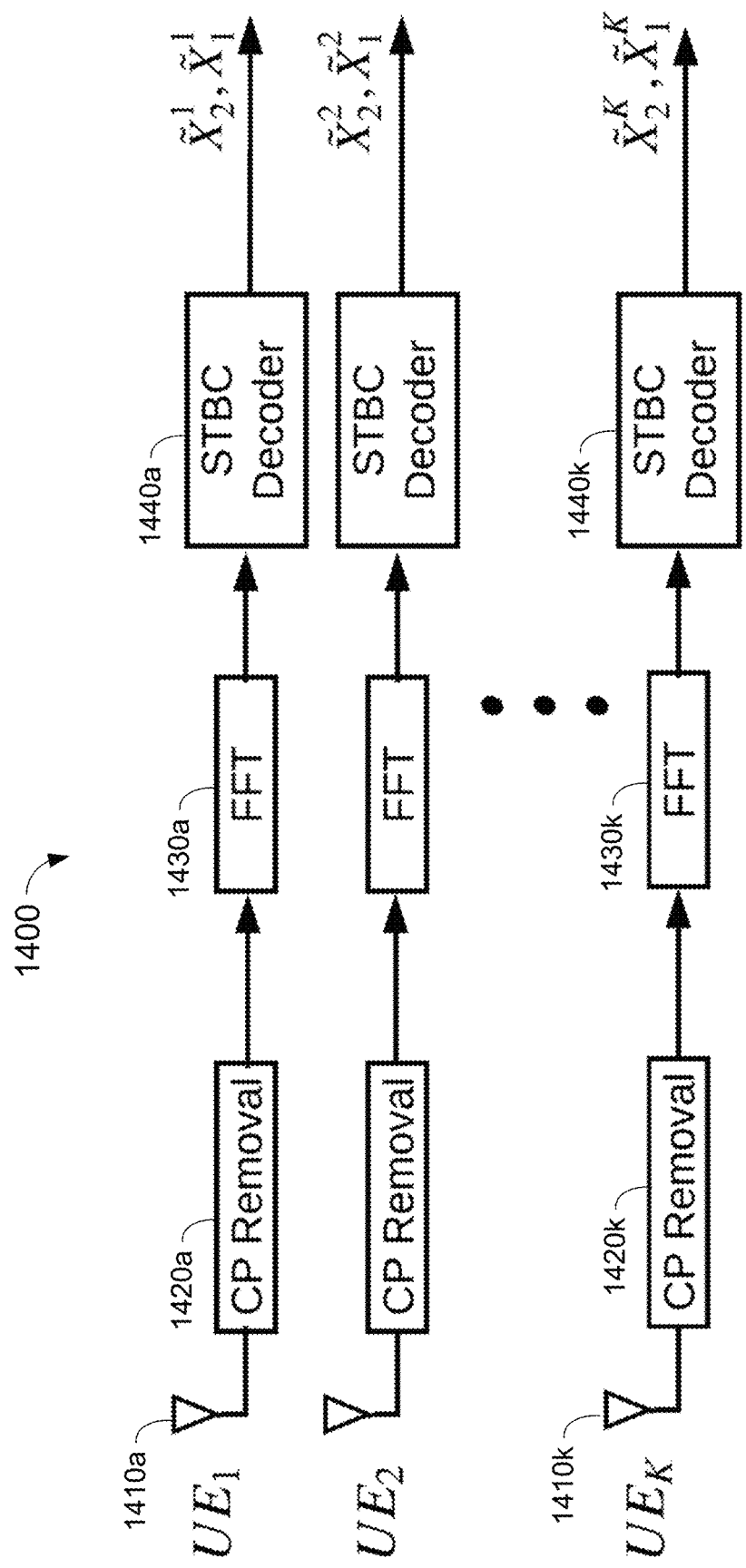
FIG. 14 is a diagram of an exemplary wideband space-time coded massive MIMO receiver in accordance with one or more embodiments of the present invention.

A block diagram of an exemplary wideband space-time coded massive MIMO receiver 1400 is shown in FIG. 14. For simplicity, we assume that each user has one of the receive antennas 1410a-k. Consider the following baseband channel impulse response (CIR) vector between a transmit antenna (e.g., 1315n) and user k:

$$h_{k,m}(t) = \sum_{l=1}^{L} h_{k,m}(l)\delta(t-\tau_l)$$

where L is the CIR length, $\tau_l$ denotes the $l^{th}$ tap delay of the channel, and $\delta(x)$ is the Dirac delta function (i.e., $\delta(x)=1$ when $x=0$, and $\delta(x)=0$ otherwise). Dropping the time index t, the CIR between the transmit antenna (e.g., 1315n) and the user k in a vector form can be represented as:

$$h_{k,m}=[h_{k,m}(1),h_{k,m}(2),\ldots,h_{k,m}(L)]$$

where $h_{k,m}(l)$ denotes the complex gain of the $l^{th}$ tap.

The received signal vector of user k (i.e., $EU_k$) for the $p^{th}$ transmitted orthogonal frequency-division multiplexing (OFDM) symbol can be expressed as:

$$y_p^k = h_{k,1}*S_{p,1} + h_{k,2}*S_{p,2} + \ldots + h_{k,M}*S_{p,M}$$

where * is the convolution operator. As is known in the art, OFDM signals may include a number of closely-spaced, modulated carriers. In vector form:

$$y_p^k = [y_p^k(1), y_p^k(2), \ldots, y_p^k(N+L-1)]^T$$

Each of the $n^{th}$ elements of the received signal vector $y_p^k$ at time i can be computed using:

$$y_p^k[i] = \sum_{m=1}^{M}\sum_{\ell=1}^{L} h_{k,m}(\ell)S_{p,m}(i-\ell) + n_k(i) \text{ and } i = 1, \cdots, N$$

where $n_k(i)$ is the additive white noise. After removing the cyclic prefix at 1420a-k, the received signal $y_p^k$ can be written in matrix form as:

$$y_p^k = \begin{bmatrix} y_p^k(1) \\ \vdots \\ y_p^k(N) \end{bmatrix} = [cir(h_{k,1})]\begin{bmatrix} S_{p,1}(1) \\ \vdots \\ S_{p,1}(N) \end{bmatrix} +$$

$$[cir(h_{k,2})]\begin{bmatrix} S_{p,2}(1) \\ \vdots \\ S_{p,2}(N) \end{bmatrix} + [cir(h_{k,M})]\begin{bmatrix} S_{p,M}(1) \\ \vdots \\ S_{p,M}(N) \end{bmatrix} + n_p^k$$

where $cir(h_{k,m})$ is a function that creates a circulant matrix of size N×N from the channel vector $h_{k,m}$ and $n_p^k \in \mathbb{C}^{N\times 1}$ represents the complex additive white noise vector. As shown in FIG. 14, each user k then takes the FFT of each $y_p^k$ vector for p=1, 2 in the FFT processing blocks 1430a-k to convert the signal from the time domain to the frequency domain and obtain:

$$Y_p^k = \mathcal{F}(y_p^k) = H_1^k U_{p,1} + H_2^k U_{p,2} + \ldots + H_M^k U_{p,M} + N_p^k \quad (14)$$

where $N_p^k = F(n_p^k)$ and $H_m^k$ is a diagonal matrix with diagonal entries of $[H_m^k(1), H_m^k(2), H_m^k(N)]$ that is obtained from the following relation:

$$H_m^k = \mathcal{F}(cir(h_{k,m}))$$

By expanding equation (14), we obtain:

$$Y_p^k = \begin{bmatrix} Y_p^k(1) \\ \vdots \\ Y_p^k(N) \end{bmatrix} = [H_1^k]\begin{bmatrix} U_{p,1}(1) \\ \vdots \\ U_{p,1}(N) \end{bmatrix} + \ldots + [H_M^k]\begin{bmatrix} U_{p,M}(1) \\ \vdots \\ U_{p,M}(N) \end{bmatrix} + N_p^k$$

Using the asymptotical orthogonality property of the channels in the frequency domain when $M\to\infty$, we arrive at $H_m^k(n)^* H_r^k(n) = H_m^k(n)$ when m=r, and zero otherwise. When the precoder coefficient is:

$$w_m^k(n) = \frac{(H_m^k(n))^*}{M\|H_m^k(n)\|}$$

and use the asymptotical orthogonality property of the channel vector from Equation (14), when p=t, we obtain:

$$Y_t^k = \begin{bmatrix} Y_t^k(1) \\ Y_t^k(2) \\ \vdots \\ Y_t^k(N) \end{bmatrix} = \begin{bmatrix} X_1^k(1) \\ X_1^k(2) \\ \vdots \\ X_1^k(N) \end{bmatrix} + \begin{bmatrix} X_2^k(1) \\ X_2^k(2) \\ \vdots \\ X_2^k(N) \end{bmatrix} + \begin{bmatrix} N_t^k(1) \\ N_t^k(2) \\ \vdots \\ N_t^k(N) \end{bmatrix}$$

and when p=t+T, we obtain:

$$Y_{t+T}^k = \begin{bmatrix} Y_{t+T}^k(1) \\ Y_{t+T}^k(2) \\ \vdots \\ y_{t+T}^k(N) \end{bmatrix} = \begin{bmatrix} -X_1^{k*}(1) \\ -X_1^{k*}(2) \\ \vdots \\ -X_1^{k*}(N) \end{bmatrix} + \begin{bmatrix} X_2^{k*}(1) \\ X_2^{k*}(2) \\ \vdots \\ X_2^{k*}(N) \end{bmatrix} + \begin{bmatrix} N_{t+T}^k(1) \\ N_{t+T}^k(2) \\ \vdots \\ N_{t+T}^k(N) \end{bmatrix}$$

The STBC decoder shown in FIG. 14 uses the above two equations to estimate $\{X_1^k(n), X_2^k(n)\}$ for $k \in \{1, 2, \ldots, K\}$ and $n \in \{1, 2, \ldots, N\}$ as follows:

$$\Rightarrow \begin{cases} \tilde{X}_1^k(n) = Y_t^k(n) - Y_{t+T}^{k*}(n) \\ \tilde{X}_2^k(n) = Y_t^k(n) + Y_{t+T}^{k*}(n) \end{cases}$$

The receiver 1400 (i.e., the cyclic prefix removal blocks 1420$a$-$k$, the FFT blocks 1430$a$-$k$, and space-time decoders 1440$a$-$k$), can also be implemented in a digital signal processor, an FPGA or an ASIC similarly to, but separate from, the transmitter 1300. The present massive MIMO systems can be used to process and communicate data/information in present- and future-generation wireless communication systems. These function blocks in the figures may be implemented in hardware, firmware and/or software. The present systems may be included with other communication function blocks in larger wireless communication systems and/or protocols (e.g., for 4G, 5G, 6G and LTE/LTE-A cellular systems and/or cellular towers).

An Exemplary Wideband Space-Frequency Coded Massive MIMO System and Method

The architecture of an exemplary wideband space-frequency coded (SFC) massive MIMO system is similar to that of the wideband STBC massive MIMO system described above with regard to FIGS. 13-14, except for the space-time processing (i.e., the space-time encoders 1330$a$-1330$k$). In the exemplary SFC massive MIMO architecture, instead of spreading the code across the time slots, the code is spread across the OFDM subcarriers (subchannels).

For simplicity, consider the SFC with a 2×2 Alamouti block and two transmit antenna subarrays (e.g., as shown in FIG. 13). For each user k, the SFC encoder takes in one OFDM symbol $X_p^k = [X_p^k(1), X_p^k(2), \ldots, X_p^k(N)]$ and starts the coding process by picking up the first two consecutive symbols $X_p^k(1)$ and $X_p^k(2)$ and creating the first Alamouti block code as:

$$\begin{bmatrix} -X_p^{k*}(2) & X_p^k(1) \\ -X_p^{k*}(1) & X_p^k(2) \end{bmatrix}$$

Repeating this process for the rest of the symbols of $X_p^k$, assuming that N is even, the SFC encoder produces two OFDM symbols of size N for each user k. Those symbols can be represented by:

$$X_{p,1}^k = [X_p^k(1), -X_p^{k*}(2), X_p^k(3), -X_p^{k*}(4), \ldots, X_p^k(N-1), -X_p^{k*}(N)]$$

$$X_{p,2}^k = [-X_p^{k*}(1), X_p^k(2), -X_p^{k*}(3), X_p^k(4), \ldots, -X_p^{k*}(N-1), -X_p^{k*}(N)]$$

The system then sends the first OFDM symbol for all users (i.e., $X_{p,1}^k$, $k \in \{1, 2, \ldots, K\}$) to the first digital precoder 1320$a$ and the second OFDM symbol $X_{p,2}^k$ to the second digital precoder 1320$b$. The remainder of the system and process is similar to that of the wideband STBC massive MIMO system and method described above. The main advantage of this method is that the user equipment can detect the data immediately after receiving each OFDM symbol. In the Universal Mobile Telecommunications System, user equipment refers to any device used directly by an end-user to communicate. In GSM systems, user equipment corresponds to a mobile station. In wideband STBC massive MIMO systems, the user equipment typically receives multiple OFDM symbols (depending on the time dimension of the block code) before detecting the data. The SFC massive MIMO system and method can be restructured to transmit M×T SFC codes.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A wireless communication system, comprising:
   an encoder configured to space-time encode data as a matrix;
   $N_t$ transmitters, each having $M/N_t$ transmit antennas and being configured to transmit the space-time encoded data from the corresponding $M/N_t$ transmit antennas, where $N_t$ is an integer of at least 2, M is an integer of at least 4, a first one of the $N_t$ transmitters transmits the matrix as a first channel vector from each of the corresponding $M/N_t$ transmit antennas in the first one of the $N_t$ transmitters, a second one of the $N_t$ transmitters transmits the matrix as a second channel vector from each of the corresponding $M/N_t$ transmit antennas in the second one of the $N_t$ transmitters, and the first and second vectors are orthogonal to each other;
   a receiver having $N_r$ receive antennas configured to receive the space-time encoded data, where $N_r$ is an integer of at least 2; and
   a decoder configured to decode the space-time encoded data from the receiver.

2. The wireless communication system of claim 1, wherein $N_t$ is an integer of at least 3, and M is an integer of at least 12.

3. The wireless communication system of claim 2, wherein $N_t$ is an integer of at least 4, and M is an integer of at least 100.

4. The wireless communication system of claim 1, wherein the encoder encodes the data at a rate of 1 symbol or less per transmission time period.

5. The wireless communication system of claim 4, wherein the rate at which the encoder encodes the data is $(N_t - 1)/N_t$ symbols or less per transmission time period.

6. The wireless communication system of claim 5, wherein $N_t$ is an integer of at least 3.

7. The wireless communication system of claim 6, wherein the matrix is an $N_t \times N_t$ matrix.

8. The wireless communication system of claim 7, wherein each of the $M/N_t$ transmit antennas transmits a corresponding and/or unique row of the data in or from the matrix.

9. The wireless communication system of claim 8, wherein the data comprises a sequence of symbols.

10. The wireless communication system of claim 9, wherein each of the symbols has at least 4 states.

11. The wireless communication system of claim 10, wherein each of the symbols has at least 16 states.

12. The wireless communication system of claim 1, wherein the encoder encodes the data at a rate of 1 symbol or less per transmission time period.

13. The wireless communication system of claim 1, wherein the data comprises a sequence of symbols, and the matrix comprises:
  a first symbol and a second symbol at a first time, and
  (i) one of the first symbol and the second symbol and (ii) an inverse of the other of the first symbol and the second symbol at a second time later than the first time.

14. A method of wirelessly communicating data, comprising:
  space-time encoding data as a matrix;
  transmitting the space-time encoded data from $N_t$ transmitters, each having $M/N_t$ transmit antennas, where $N_t$ is an integer of at least 3, and M is an integer of at least 12, a first one of the $N_t$ transmitters transmits the matrix as a first channel vector from each of the corresponding $M/N_t$ transmit antennas in the first one of the $N_t$ transmitters, a second one of the $N_t$ transmitters transmits the matrix as a second channel vector from each of the corresponding $M/N_t$ transmit antennas in the second one of the $N_t$ transmitters, the first and second vectors are orthogonal to each other;
  receiving the space-time encoded data at a receiver having $N_r$ receive antennas, where $N_r$ is an integer of at least 2; and
  decoding the space-time encoded data.

15. The method of claim 14, wherein the encoder encodes the data at a rate of 1 symbol or less per transmission time period.

16. The method of claim 14, wherein the data comprises a sequence of symbols, each of the symbols has at least 4 states, and the matrix comprises:
  a first symbol and a second symbol at a first time, and
  (i) one of the first symbol and the second symbol and (ii) an inverse of the other of the first symbol and the second symbol at a second time later than the first time.

17. A method of making a wireless communication system, comprising:
  operably connecting $N_t$ transmitters to an encoder configured to space-time encode data, each of the $N_t$ transmitters having $M/N_t$ transmit antennas and being configured to transmit the space-time encoded data from the corresponding $M/N_t$ transmit antennas, where $N_t$ is an integer of at least 2, M is an integer of at least 4, the encoder space-time encodes the data as a matrix, a first one of the $N_t$ transmitters transmits the matrix as a first channel vector from each of the corresponding $M/N_t$ transmit antennas in the first one of the $N_t$ transmitters, a second one of the $N_t$ transmitters transmits the matrix as a second channel vector from each of the corresponding $M/N_t$ transmit antennas in the second one of the $N_t$ transmitters, and the first and second vectors are orthogonal to each other;
  operably connecting a decoder configured to decode the space-time encoded data to a receiver having $N_r$ receive antennas configured to receive the space-time encoded data, where $N_r$ is an integer of at least 2; and
  configuring the $N_t$ transmitters and the receiver so that the $N_t$ transmitters wirelessly communicate the space-time encoded data to the receiver.

18. The method of claim 17, wherein:
the matrix comprises:
  a first symbol and a second symbol at a first time, and
  (i) one of the first symbol and the second symbol and (ii) an inverse of the other of the first symbol and the second symbol at a second time later than the first time, and
$N_t$ is an integer of at least 3, and M is an integer of at least 12.

\* \* \* \* \*